(12) United States Patent
Makki et al.

(10) Patent No.: US 11,012,177 B2
(45) Date of Patent: May 18, 2021

(54) MESSAGE AND RATE BASED USER GROUPING IN NON-ORTHOGONAL MULTIPLE ACCESS (NOMA) NETWORKS

(71) Applicant: Telefonaktiebolaget LM Ericsson (publ), Stockholm (SE)

(72) Inventors: Behrooz Makki, Gothenburg (SE); Ali Behravan, Stockholm (SE); Mona Hashemi, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 519 days.

(21) Appl. No.: 16/066,491

(22) PCT Filed: Apr. 6, 2018

(86) PCT No.: PCT/EP2018/058841
§ 371 (c)(1),
(2) Date: Jun. 27, 2018

(87) PCT Pub. No.: WO2019/192719
PCT Pub. Date: Oct. 10, 2019

(65) Prior Publication Data
US 2021/0083793 A1    Mar. 18, 2021

(51) Int. Cl.
*H04W 72/08* (2009.01)
*H04J 99/00* (2009.01)
*H04B 17/309* (2015.01)

(52) U.S. Cl.
CPC ............ *H04J 15/00* (2013.01); *H04B 17/309* (2015.01); *H04W 72/085* (2013.01)

(58) Field of Classification Search
CPC ..... H04W 72/085; H04J 15/00; H04B 17/309
See application file for complete search history.

(56) References Cited

U.S. PATENT DOCUMENTS

| | | | | |
|---|---|---|---|---|
| 2018/0070225 | A1* | 3/2018 | Soldati | H04W 72/0406 |
| 2018/0212711 | A1* | 7/2018 | Zhu | H04L 5/0057 |
| 2019/0052309 | A1* | 2/2019 | Schmidt | H04L 5/0037 |
| 2019/0140741 | A1* | 5/2019 | Cheng | H04J 15/00 |
| 2019/0253845 | A1* | 8/2019 | Makki | H04L 5/006 |

FOREIGN PATENT DOCUMENTS

| | | |
|---|---|---|
| KR | 101070040 B1 | 10/2011 |
| WO | 2015/144250 A1 | 10/2015 |

(Continued)

OTHER PUBLICATIONS

First Examination Report for Indian Patent Application No. IN 201847024210 dated Jun. 16, 2020, 7 pages (including English translation).

(Continued)

*Primary Examiner* — Hoon J Chung
(74) *Attorney, Agent, or Firm* — Sage Patent Group

(57) ABSTRACT

A message and rate based UE grouping system for dense downlink NOMA systems. For example, a network node (e.g., an access point, such as a base station) determines whether a first UE and a second UE should be grouped based on a determination of whether there is overlap between a first message for the first UE and a second message for the second UE.

22 Claims, 11 Drawing Sheets

(56) References Cited

FOREIGN PATENT DOCUMENTS

WO   2016/180501 A1   11/2016
WO   2017/050760 A1   3/2017

OTHER PUBLICATIONS

3GPP, 3rd Generation Partnership Project; Technical Specification Group Radio Access Network; Study on Network-Assisted Interference Cancellation and Suppression (NAIC) for LTE, (Release 12), 3GPP TR 36.866, V12.0.1, (Mar. 2014), 64 pages.
MediaTek, "New SI Proposal; Study on Downlink Multiuser Superposition Transmission for LTE", 3GPP TSG RAN Meeting #67, RP-150496, Shanghai, China, Mar. 9-12, 2015, 7 pages.
MCC Support, "Final Report of 3GPP TSG RAN WG1 #85 v1.0.0.", 3GPP TSG RAN WG1 Meeting #86, R1-166056, Göteborg, Sweden, Aug. 22-26, 2016, 170 pages.
Xu et al., "NOMA: An Information Theoretic Perspective", arXiv:1504.07751v2 [cs.IT], May 12, 2015, 6 pages.
Diaconis et al., "Methods for Studying Coincidences", Journal of the American Statistical Association, vol. 84, No. 408, Application & Case Studies, Dec. 1989, 10 pages.
International Search Report and Written Opinion issued in International Application No. PCT/EP2018/058841, dated Feb. 5, 2019, 15 pages.

\* cited by examiner

MESSAGE AND RATE BASED USER GROUPING IN NON-ORTHOGONAL MULTIPLE ACCESS (NOMA) NETWORKS

CROSS REFERENCE TO RELATED APPLICATION(S)

This application is a 35 U.S.C. § 371 National Stage of International Patent Application No. PCT/EP2018/058841, filed Apr. 6, 2018, designating the United States, the disclosure of which is incorporated by reference.

TECHNICAL FIELD

Disclosed are embodiments related to non-orthogonal multiple access (NOMA) networks.

BACKGROUND

The design of multiple access schemes is of interest in the design of cellular telecommunication systems. The goal of multiple access schemes is to provide multiple user equipments (UEs) (i.e., wireless communication devices, such as, for example, smartphones, tablets, phablets, smart sensors, wireless Internet-of-Things (IoT) devices, etc., that are capable of wirelessly communicating with an access point) with radio resources in a spectrum, cost, and complexity-efficient manner. In 1G-3G wireless communication systems, frequency division multiple access (FDMA), time division multiple access (TDMA) and frequency division multiple access (CDMA) schemes have been introduced. Long-Term Evolution (LTE) and LTE-Advanced employ orthogonal frequency division multiple access (OFDMA) and single-carrier (SC)-FDMA as orthogonal multiple access (OMA) schemes. Such orthogonal designs have the benefit that there is no mutual interference among UEs, leading to high system performance with simple receivers.

Recently, non-orthogonal multiple access (NOMA) has received considerable attention as a promising multiple access technique for LTE and 5G systems. With NOMA, two or more UEs may share the same radio resources (e.g., time resources, frequency resources, and/or code resources). Particularly, 3GPP has considered NOMA in different applications. For instance, NOMA has been introduced as an extension of the network-assisted interference cancellation and suppression (NAICS) for intercell interference (ICI) mitigation in LTE Release 12 as well as a study item of LTE Release 13, under the name of "Downlink multiuser superposition transmission." Also, in recent 3GPP meetings, it is decided that new radio (NR) should target to support (at least) uplink NOMA, in addition to the OMA approach.

SUMMARY

NOMA not only outperforms OMA in terms of sum rate, but also is optimal in achieving the maximum capacity region. However, the performance gain of NOMA depends greatly on the availability of channel state information (CSI), which affects the UEs grouping, beamforming and power allocation significantly. On the other hand, due to the implementation complexity and the decoding delay of NOMA, it is of most interest to use NOMA in dense networks where a large number of UEs may request access at the same time such that there are not enough orthogonal resources to serve all of the requesting UEs an OMA-fashion. In such scenarios, CSI acquisition becomes the bottleneck of the system performance as it may consume a large portion of the available spectrum.

Certain embodiments disclosed herein provide a rate and message based UE grouping method for dense downlink NOMA systems. The objective is to satisfy the tradeoff between the performance gain of NOMA and the cost of CSI acquisition.

For instance, in one aspect there is provided a method performed by a network node for scheduling at least a first UE served by the network node and a second UE also by the network node. The method includes the network node determining that the first UE and the second UE are candidates to be grouped together, wherein the determining comprises determining whether there is an overlap between a first message for the first UE and a second message for the second UE. As a result of determining that the first UE and the second UE are candidates to be grouped together, the network node estimates 1) a first channel quality of a first channel between the first UE and the network node and 2) a second channel quality of a second channel between the second UE and the network node. After estimating the channel qualities, the network node determines, based on the estimated channel qualities, to use the same time and frequency resources to transmit downlink data to the first UE and the second UE.

In some embodiments, the method further includes the network node transmitting an indication indicating the same time and frequency resources to the first UE and the second UE. In some embodiments, the method further includes the network node transmitting an index indicating the overlap between the first message and the second message to the first UE and the second UE.

In some embodiments, the method further includes allocating a first power for transmitting downlink data to the first UE and allocating a second power for transmitting downlink data to the second UE.

In some embodiments, the step of determining that the first UE and the second UE are candidates to be grouped together includes calculating a probability value and determining whether the calculated probability value is not less than a probability threshold. In some embodiments, the first UE has a first rate demand, the second UE has a second rate demand, and the probability value indicates a probability that a first achievable rate is not less than the first rate demand and a second achievable rate is not less than the second rate demand.

In some embodiments, the step of estimating the first channel quality includes requesting the first UE to transmit a pilot signal and estimating the first channel quality based on the pilot signal transmitted by the first UE. In some embodiments, the step of estimating the second channel quality includes requesting the second UE to transmit a pilot signal and estimating the second channel quality based on the pilot signal transmitted by the second UE.

In some embodiments, the step of determining, based on the estimated channel qualities, to use the same time and frequency resources to transmit downlink data to the first UE and the second UE includes obtaining information indicating the first rate demand, obtaining information indicating the second rate demand, determining a first channel gain for the first UE based on the estimated first channel quality, determining a second channel gain for the second UE based on the estimated second channel quality, and using the first rate demand, the second rate demand, the first channel gain, and the second channel gain to determine whether to use the same time and frequency resources to transmit downlink data to the first UE and the second UE.

In some embodiments, the step of determining, based on the estimated channel qualities, to use the same time and frequency resources to transmit downlink data to the first UE and the second UE includes obtaining a first set of data points for a first decoding scheme, each data point included in the first set of data points identifying a maximum achievable rate for the first UE and a maximum achievable rate for the second UE, obtaining information indicating the first rate demand, obtaining information indicating the second rate demand, and using the first set of data points, the first rate demand, and the second rate demand to determine whether to use the same time and frequency resources to transmit downlink data to the first UE and the second UE.

In some embodiments, using the set of data points, the first rate demand, and the second rate demand to determine whether to use the same time and frequency resources to transmit downlink data to the first UE and the second UE includes selecting a data point from the set of data points, wherein selected data points identifies a maximum achievable rate for the first UE that is equal to the rate demand for the first UE, and determining whether the maximum achievable rate for the second UE identified by the selected data point is greater than or equal to the rate demand for the second UE. In some embodiments, using the set of data points, the first rate demand, and the second rate demand to determine whether to use the same time and frequency resources to transmit downlink data to the first UE and the second UE includes selecting a data point from the set of data points, wherein selected data points identifies a maximum achievable rate for the second UE that is equal to the rate demand for the second UE, and determining whether the maximum achievable rate for the first UE identified by the selected data point is greater than or equal to the rate demand for the first UE.

Compared to the conventional NOMA techniques, the above embodiments reduce the CSI acquisition overhead considerably. In the proposed method, it is not required that all UEs send their CSI. For example, CSI may be transmitted to the network node after the network node has determined that, with high probability, certain UEs can be grouped in a NOMA fashion. This leads to remarkable improvement in the end-to-end throughput. Particularly, the relative overhead reduction and throughput gains increase in dense scenarios, which are of most interest in NOMA-based systems.

BRIEF DESCRIPTION OF THE DRAWINGS

The accompanying drawings, which are incorporated herein and form part of the specification, illustrate various embodiments.

DETAILED DESCRIPTION

Figure 1:
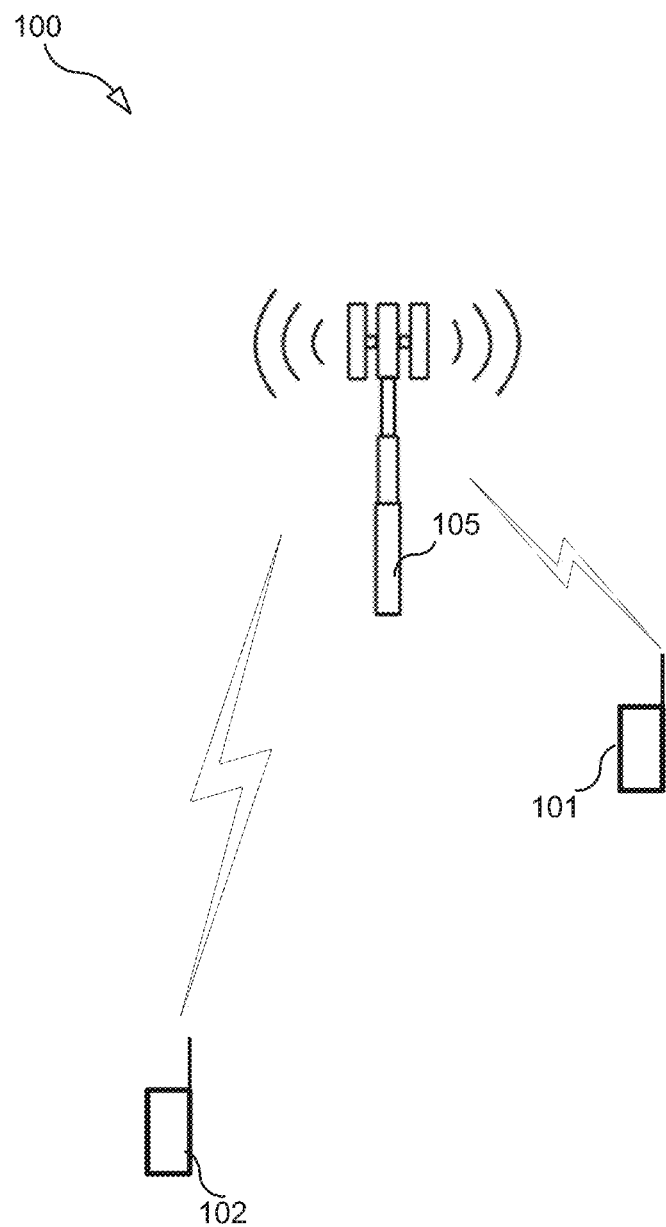
FIG. 1 illustrates a TRP communicating with a UE using a high-gain beam.

FIG. 1 illustrates a network 100 having a network node 105 (e.g., access point (AP) such as, for example, a 4G or 5G base station or other access point) serving a large number of UEs—e.g., UE 101, UE 102, etc. While only two UEs are shown, network node 150 may serve N number of UEs, where N>>2. The UEs connect to the network node 105 using a limited number of spectrum resource blocks, i.e., time-frequency chunks.

Let us consider a single time slot, so that the time-frequency chunks refer to different frequency bands. Also, denote the number of UEs by N and the number of chunks by N_c, and assume that N_c<N,—that is, the number of resources are not enough to serve all UEs in orthogonal resources. In this scenario, two or more UEs may be grouped and served in a NOMA-based fashion. In an ideal case, NOMA has the potential to improve the performance of OMA-based systems, in terms of network capacity. However, the performance gain of NOMA depends much on the amount of CSI available. Particularly, the throughput of NOMA-based approach depends on if there are appropriate UE groupings. However, to perform an appropriate UE grouping we need to have accurate information about the quality of the various channels between the UEs and the network node 105 and the UEs' rate demands, which leads to huge overhead in dense networks. For instance, the optimal grouping algorithm needs to know all N_c×N channel coefficients and all N rate demands making the whole system impractical in dense scenarios. This is especially true because a large portion of this CSI is used only for UE grouping and not for data transmission. Furthermore, the UEs which cannot decode and remove the signals of other UEs (also referred to as cell-edge UEs), may experience high interference power depending on the channel quality of the link between the UE and the network node 105. In such cases, the relative performance gain of NOMA may be so low that it is not worth the additional implementation complexity. Therefore, to implement NOMA in dense networks, it is beneficial to design a limited CSI-based scheme with smart interference management.

Figure 2A:
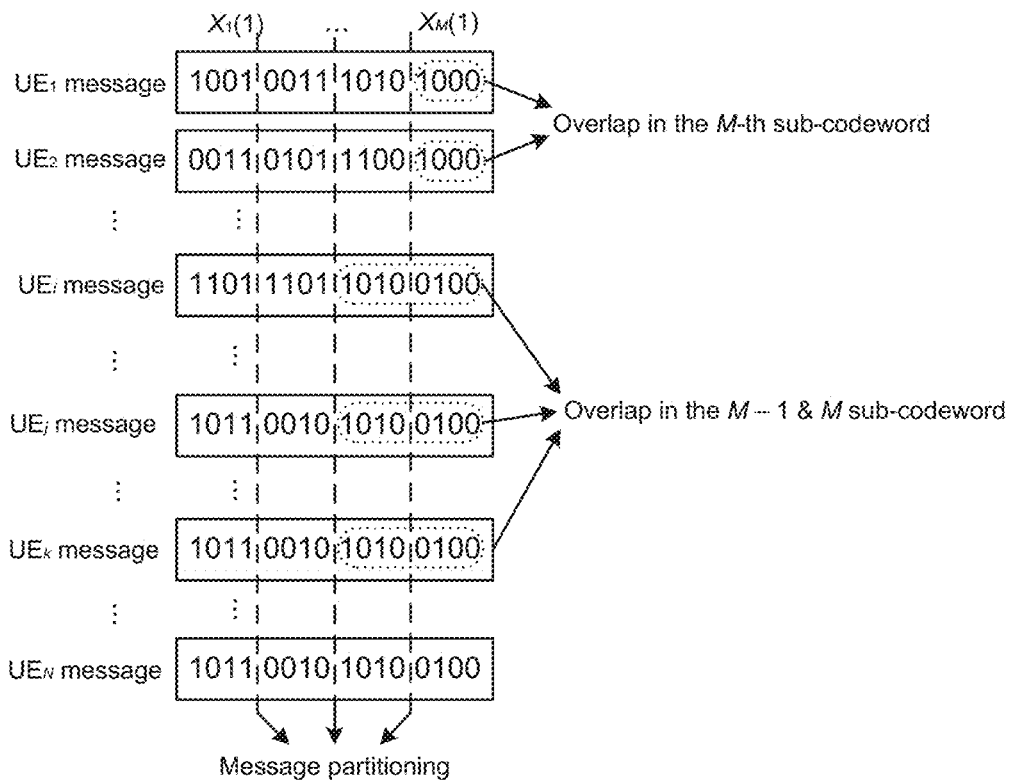
FIGS. 2A-2B illustrates UEs with overlapping and non-overlapping messages according to some embodiments.
Figure 2B:
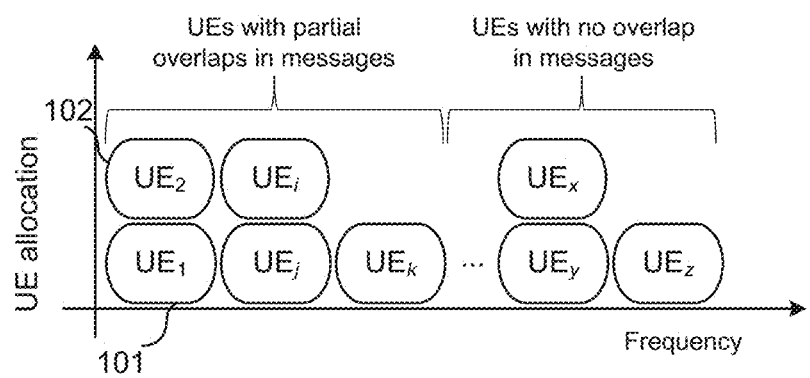

In some embodiments, the network node 105 considers some predefined boundaries and partitions the codewords into a number of short sub-codewords. As shown in FIG. 2A, a message for UE i may be partitioned into M sub-codewords, i.e., $X_i=[X_i(1) \ldots X_i(M)]$ where $X_i$ is the information signal of UE i, $X_i(m)$ denotes its m th sub-codeword, $1 \leq m \leq M$, and $1 \leq i \leq N$. In some embodiments, the sub-codewords may be of length L for a codeword of length ML. In some embodiments, codewords may comprise any number of sub-codewords. Code block groups (CBG) in new radio (NR) is an example where a codeword is divided into multiple blocks. UEs with partial overlaps in messages and UEs with no overlap in messages are shown in FIG. 2B. Different UE grouping schemes may be considered for UEs with and without overlaps in messages as described below.

UEs with no overlap in messages may be grouped together based on their data rates, i.e., their buffered data size, at the network node 105. In some embodiments, the network node 105 considers UEs with low data rates, i.e., small buffered data size, for possible grouping and sends a request to the UEs under consideration to transmit pilot signals. In such embodiments, the network node 105 uses the pilot signals for channel estimation and makes a final decision about the multiplexing scheme of the considered UEs and power allocation based on the channel estimation.

UEs with at least partial overlaps in messages are grouped together. The network node 105 groups UEs with overlaps in messages based on their buffered data size and message. In some embodiments, the network node 105 transmits an indication to the grouped UEs indicating an index of the overlapping sub-codewords. In such embodiments, the overlapping parts of the signals are received by the grouped UEs interference-free and successive interference cancellation (SIC) can be applied to decode the non-overlapping sub-codewords.

The following example demonstrates the effect of message-based UE grouping based on the achievable rates of the UEs. Let us consider a first UE 101 and a second UE 102 having information messages $X_1=[X_1(1)\ X_1(2)]$ and $X_2=[X_2(1)\ X_2(2)]$, respectively, where $X_i(j)$, i, j=1, 2, are of the same length and $X_1(2)=X_2(2)$. The achievable rate for the first UE 101 ($R_1$) and the achievable rate for the second UE 102 ($R_2$) for broadcasting the messages in the same frequency as in downlink NOMA are shown in (1) below:

$$\begin{cases} R_1 = \frac{1}{2}(\log_2(1+P_1g_1) + \log_2(1+Pg_1)) \\ R_2 = \frac{1}{2}\left(\log_2\left(1+\frac{P_2g_2}{1+P_1g_2}\right) + \log_2(1+Pg_2)\right). \end{cases} \quad (1)$$

Here $P_1$ and $P_2$ are the powers allocated to the messages of UE 101 and UE 102, respectively, where P is the total power of the network node 105 and $P_1+P_2=P$. Further, $g_1$ represents the channel gain of the link between the network node 105 and UE 101 while $g_2$ represents the channel gain of the link between the network node 105 and UE 102. The achievable rates shown in (1) are based on the assumption that UE 101 experiences a better channel quality compared to UE 102, i.e., $g_1 \geq g_2$. Accordingly, UE 101 performs SIC to decode both messages.

By comparing the achievable rates shown in (1) with the achievable rates of conventional NOMA shown in (2) below:

$$\begin{cases} R_1 = \log_2(1+P_1g_1) \\ R_2 = \log_2\left(1+\frac{P_2g_2}{1+P_1g_2}\right), \end{cases} \quad (2)$$

it is obvious that the achievable rates of both UEs increase with message-based UE grouping.

An embodiment of the limited CSI-based scheme with smart interference management can be explained as follows:

Step 1: The network node 105 finds the UEs (e.g., UE 101 and UE 102) with at least partially-overlapping messages. As shown in FIG. 2A, for example, $UE_1$ and $UE_2$ overlap in the M-th sub-codeword, while $UE_i$, $UE_j$, and $UE_k$ overlap in sub-codewords M−1 and M.

Step 2: For each set of message-overlapping UEs, the network node 105 performs the following steps.

The network node 105 sends a request to the message-overlapping UEs to send pilot signals using, for example, a random frequency band. Using the received pilot signals, the network node 105 estimates the channel quality for the message-overlapping UEs in the frequency band. Using the data rates of the UEs, i.e., the buffered data size for the UEs at the network node 105, and the achieve data rates shown in (1), the network node 105 finds the maximum number of UEs among the message-overlapping UEs that can be grouped. For example, FIGS. 2A-2B illustrate an embodiment where the messages of $UE_i$, $UE_j$, and $UE_k$ are partially overlapping, but only $UE_i$ and $UE_j$, and can be grouped in the same frequency because of the data rates. After determining the grouped UEs, the network node 105 determines the appropriate power allocation for the grouped UEs such that each required UE data rate can be provided. The network node 105 continues UE grouping for the set of message-overlapping UEs until the UEs can no longer grouped together. In some embodiments, if one or more message-overlapping UEs cannot be grouped in the frequency band (e.g., $UE_k$ in FIGS. 2A-2B), the network node 105 sends a request to the one or more UEs to send pilot signals in a different frequency band.

In some embodiments, the network node 105 finds the probability that the message-overlapping UEs can be served through NOMA-based data transmission before sending the request to the message-overlapping UEs to send pilot signals. In such embodiments, the network node 105 calculates the probability that the message-overlapping UEs can be successfully served through NOMA-based data transmission based on the network node's 105 peak power constraint and the buffered data size for the UEs (i.e., UE data rates) with no information about the channel quality. As an exemplary embodiment of calculating the probability, let us consider message-overlapping UEx and UEy with data rates $r_x$ and $r_y$, respectively. Based on the achievable rates shown in (1), UEx and UEy can be successfully grouped if $$r_x \leq \frac{1}{2}(\log_2(1+P_1g_1) + \log_2(1+Pg_1))$$

and $$r_y \leq \frac{1}{2}\left(\log_2\left(1+\frac{P_2g_2}{1+P_1g_2}\right) + \log_2(1+Pg_2)\right).$$

Accordingly, using $P_y=P-P_x$ and with no information about the channel quality, the probability that message-overlapping UEx and UEy can be successfully grouped is shown in (3) below:

$$\theta_{x,y} = \max_{P_x \in (0,P)} Pr\left(\text{and } \begin{array}{l} \frac{1}{2}(\log_2(1+P_xg_x)+\log_2(1+Pg_x)) > r_x \\ \frac{1}{2}\left(\log_2\left(1+\frac{P_yg_y}{1+P_xg_y}\right)+\log_2(1+Pg_y)\right) > r_y \end{array}\right) \quad (3)$$

$$= \max_{P_x \in (0,P)} Pr\left(\begin{array}{l}(1+P_xg_x)(1+Pg_x) > 2^{2r_x} \\ \text{and } \frac{(1+Pg_y)^2}{1+P_xg_y} > 2^{2r_y}\end{array}\right) = \max_{P_x \in (0,P)}\left\{e^{-d_x^\alpha \Gamma_x} e^{-d_y^\alpha \Gamma_y}\right\},$$

where $$\Gamma_x = \frac{-(P_x+P) + \sqrt{(P_x+P)^2 + 4(2^{2r_x}-1)PP_x}}{2PP_x} \text{ and}$$

-continued $$\Gamma_y = \frac{(P_x 2^{2r_y} - 2P) + \sqrt{(P_x 2^{2r_y} - 2P)^2 + 4P^2(2^{2r_y} - 1)}}{2P^2}.$$

Here, $d_x$ and $d_y$ represent the distance from the network node 105 to UEx and UEy, respectively, and a represents the path loss exponent. In some embodiments, power allocation is optimized over $P_x \in (0,P)$, which, based on the peak power limit of the network node. The last equality shown in (3) is provided for Rayleigh-fading conditions. In some embodiments, the last equality can be rewritten for other channel distributions. Accordingly, the network node 105 finds both probabilities $\theta_{x,y}$ and $\theta_{y,x}$ because the network node 105 does not know the channel qualities.

If the network node 105 estimates a high probability that these UEs can be successfully grouped, i.e., if $\theta_{x,y} \geq \theta$ or $\theta_{y,x} \geq \theta$ where $\theta$ is a constant predetermined by the network designer, the network node 105 selects a random frequency band and sends the message-overlapping UEx and UEy a request to sequentially send pilot signals.

Step 3: For UEs with no overlap in messages, the network node 105 performs the following steps.

The network node 105 calculates the probability that two or more UEs can be grouped to be successfully served through NOMA-based data transmission based on the network node's 105 peak power constraint and the buffered data size for the UEs (i.e., data rates) with no information about the channels quality. As exemplary embodiment for calculating the probability, let us consider UEw and UEz with no overlap in messages and data rates $r_w$ and $r_z$, respectively. Based on the achievable rates shown in (2), UEw and UEz can be successfully grouped if $r_w \leq \log_2(1 + P_w g_w)$ and $$r_z \leq \log_2\left(1 + \frac{P_z g_z}{1 + P_w g_z}\right).$$

Accordingly, using $P_z = P - P_w$ and with no information about the channel qualities, the probability that UEw and UEz with no overlap in messages can be successfully grouped is shown in (4) below:

$$\theta_{w,z} = \max_{P_w \in (0, 2^{-r_z} P)} Pr\left(\log_2(1 + P_w g_w) > r_w \& \log_2\left(1 + \frac{P_z g_z}{1 + P_w g_z}\right) > r_z\right) \quad (4)$$

$$= \max_{P_w \in (0, 2^{-r_z} P)} Pr\left(g_w \geq \frac{2^{r_w} - 1}{P_w} \& g_z \geq \frac{2^{r_z} - 1}{2^{r_z} P_w}\right)$$

$$= \max_{P_w \in (0, 2^{-r_z} P)} \left\{e - \frac{d_w^\alpha(2^{r_w} - 1)}{P_w} e - \frac{d_z^\alpha(2^{r_z} - 1)}{P - 2^{r_z} P_w}\right\}.$$

Here, $d_w$ and $d_z$ represent the distances from the network node 105 to UEw and UEz, respectively, and a represents the path loss exponent. In some embodiments, power allocation is optimized over $P_w \in (0, 2^{-r_z} P)$, which, based on the achievable rates shown in (2), is the only region in which the network node 105 is able to support the data rate of UEz. The last equality shown in (4) is provided for Rayleigh-fading conditions. In some embodiments, the last equality can be rewritten for other channel distributions. Accordingly, the network node 105 finds both probabilities $\theta_{x,y}$ and $\theta_{y,x}$ because the network node 105 does not know the channels qualities.

If the network node 105 estimates a high probability that these UEs can be successfully grouped, i.e., if the $\theta_{w,z} \geq \theta_{z,w}$ or $\theta_{z,w} \geq \theta$ where $\theta$ is a constant predetermined by the network designer, the network node 105 selects a random frequency band and sends the UEw and UEz a request to sequentially send pilot signals. Then, using the received pilot signals, the network node 105 estimates the channel qualities and determines whether UEw and UEz with no overlap in messages can be grouped based on the estimated channel qualities. Once the network node 105 determines that UEw and UEz can be grouped, the network node 105 determines the appropriate power allocation for each UE.

Step 4: The network node 105 informs all UEs about their selected multiplexing schemes. In some embodiments, the network node 105 transmits to the UEs an indication indicating the selected multiplexing schemes. For UEs with overlapping-messages, the network node 105 transmits the index of the overlapping sub-codewords according to some embodiments. In some embodiments, the network node 105 transmits pilot signals to the UEs in each corresponding frequency band. In such embodiments, the UEs may estimate their channel quality based on the received pilot signal.

Step 5: Each UE selects an appropriate decoding scheme and decodes the messages based on the selected multiplexing scheme. For UEs with overlapping messages, selecting the appropriate decoding includes using the received index of the overlapping sub-codewords according to some embodiments.

As described in the embodiments described in the current disclosure, the network node 105 determines the channel quality only if the network node 105 estimates a high probability for successful UE grouping. This reduces CSI overhead considerably, particularly in dense networks and/or in cases where UEs have multiple antennas.

The effectiveness of the message-based UE grouping described in the current disclosure depends largely on whether UEs with partial message overlap can be found. This depends on the number of sub-codewords, the number of UEs, and the codewords length. The probability of finding UEs with overlapping messages increases if the messages comprise many short sub-codewords, i.e. many partitions. On the other hand, the rate gain of message-based UE grouping decreases with an increase in short sub-codewords because less of the grouped UEs messages are received interference-free. Accordingly, there is a tradeoff when it comes to the number of short sub-codewords. Thus, an optimal number of message partitions may be determined based on the number of UEs in the network. In some embodiments, the probability of finding at least two overlapping UEs in a network with N UEs and sub-codewords of length L is given by $$Pr(\text{at least } 2UEs \text{ with overlapping messages}) \cong 1 - e^{\frac{-N^2}{2^{L+1}}}.$$

As such, the probability of finding at least two UEs with partially-overlapping message increases exponentially based on the number of UEs. For example, Pr(at least 2 UEs with overlapping messages)=0.999, 0.992 and 0.705 when L=8, 10 and 12, respectively, and N=100. Accordingly, there is high a probability in dense networks to find UEs with partial overlaps in messages and improve the achievable rates of NOMA. Where there are no UEs with partial overlaps in messages, the data rate based UE grouping scheme described herein considerably reduces the CSI overhead.

In the embodiments described in the current disclosure, the probability calculation shown in (4) was used to determine whether UEs with no overlap in messages can be successfully grouped. However, this is not required and different approaches can be considered in alternative embodiments. For example, when the data rates of the UEs with non-overlapping messages are defined as $r_{n_1}, r_{n_2}, \ldots, r_{n_q}$, such that $r_{n_1} \leq r_{n_2} \leq \ldots \leq r_{n_q}$, the probability that two UEs can be successfully grouped according to (4) increases if both data rates $r_x$ and $r_y$ are low. Thus, an appropriate UE grouping approach would be $(r_{n_1}, r_{n_2})$, $(r_{n_3}, r_{n_4})$ to have a high probability of successful grouping in this example.

The method of grouping UEs based on their data rates described herein can be applied to both downlink and uplink. Grouping UEs based on their message can only be done in the downlink because downlink data is only known at the network node 105.

Figure 3:
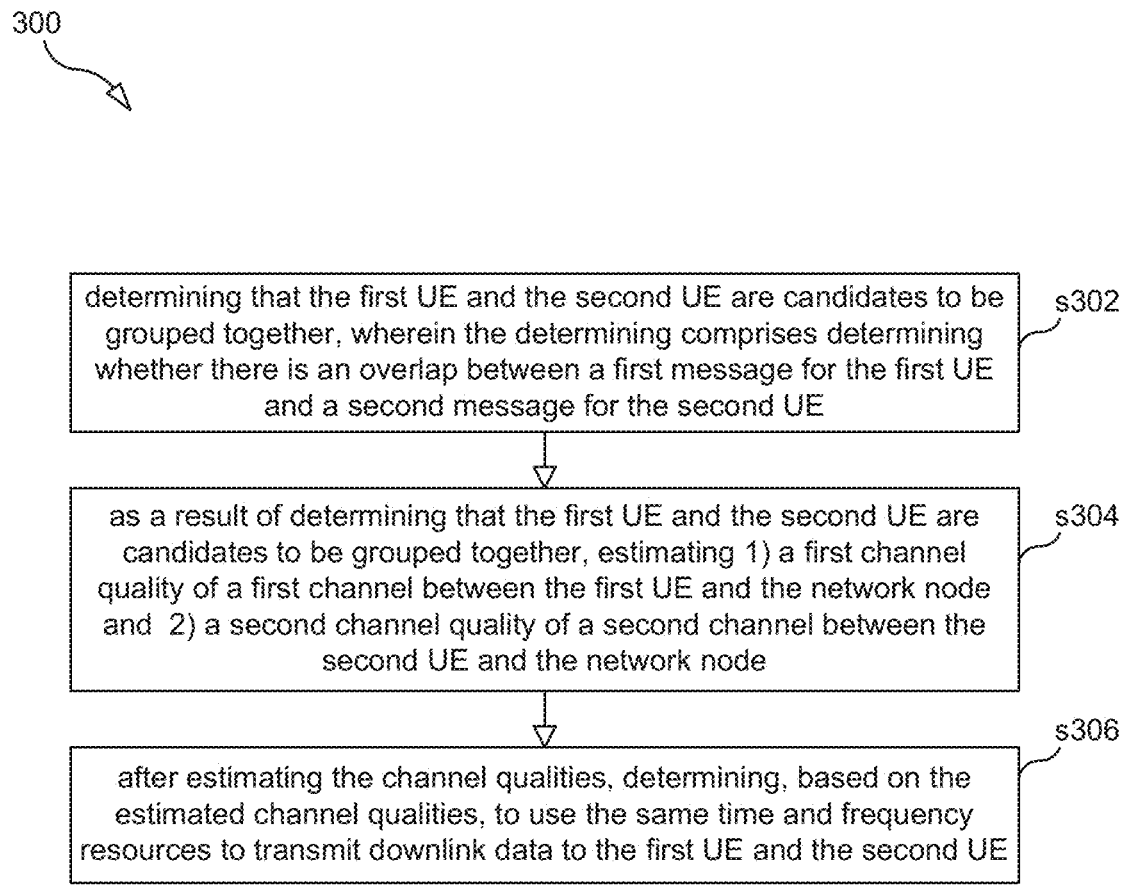
FIG. 3 is a flow chart illustrating a process according to one embodiment.

FIG. 3 is a flow chart illustrating a process 300, according to some embodiments, that is performed by network node 105 for scheduling at least a first UE (UE 101) served by the network node and a second UE (UE 102) also served by the network node. Process 300 may begin with step s302 in which network node 105 determining that the first UE and the second UE are candidates to be grouped together, wherein the determining comprises determining whether there is an overlap between a first message for the first UE and a second message for the second UE. In step s304, as a result of determining that the first UE and the second UE are candidates to be grouped together, the network node estimates 1) a first channel quality of a first channel between the first UE and the network node and 2) a second channel quality of a second channel between the second UE and the network node. In step s306, after estimating the channel qualities, determining, based on the estimated channel qualities, to use the same time and frequency resources to transmit downlink data to the first UE and the second UE.

In some embodiments, the process 300 includes a further step in which the network node transmits an indication indicating the same time and frequency resources to the first UE and the second UE. In some embodiments, the process 300 includes a further step in which the network node transmits an index indicating the overlap between the first message and the second message to the first UE and the second UE.

In some embodiments, the process 300 includes a further step in which the network node allocate a first power for transmitting downlink data to the first UE and allocates a second power for transmitting downlink data to the second UE.

In some embodiments, the step of determining that the first UE and the second UE are candidates to be grouped together includes calculating a probability value and determining whether the calculated probability value is not less than a probability threshold. In some embodiments, the first UE has a first rate demand, the second UE has a second rate demand, and the probability value indicates a probability that a first achievable rate is not less than the first rate demand and a second achievable rate is not less than the second rate demand.

In some embodiments, the step of estimating the first channel quality includes requesting the first UE to transmit a pilot signal and estimating the first channel quality based on the pilot signal transmitted by the first UE. In some embodiments, the step of estimating the second channel quality includes requesting the second UE to transmit a pilot signal and estimating the second channel quality based on the pilot signal transmitted by the second UE.

In some embodiments, the step of determining, based on the estimated channel qualities, to use the same time and frequency resources to transmit downlink data to the first UE and the second UE includes obtaining information indicating the first rate demand, obtaining information indicating the second rate demand, determining a first channel gain for the first UE based on the estimated first channel quality, determining a second channel gain for the second UE based on the estimated second channel quality, and using the first rate demand, the second rate demand, the first channel gain, and the second channel gain to determine whether to use the same time and frequency resources to transmit downlink data to the first UE and the second UE.

Figure 4:
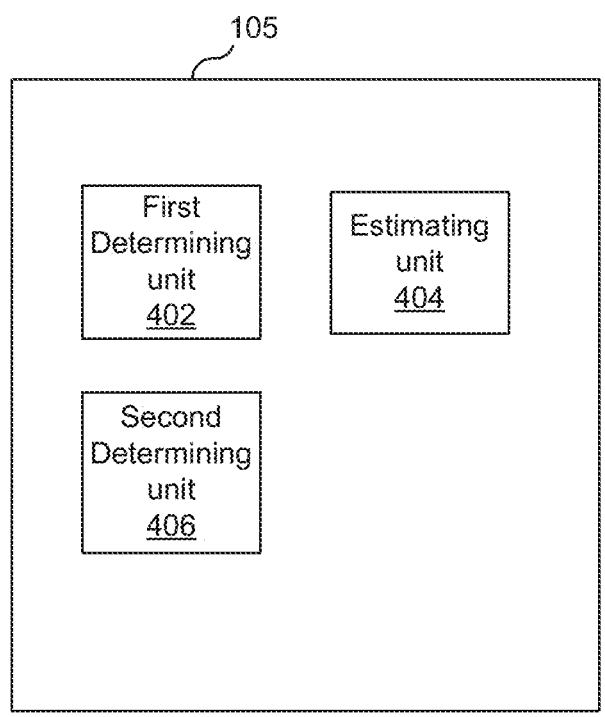
FIG. 4 is a diagram showing functional units of a network node according to one embodiment.

FIG. 4 is a diagram showing functional units of network node 105 according to some embodiments. As shown in FIG. 5, network node 105 includes a first determining unit 502 for determining that the first UE and the second UE are candidates to be grouped together, wherein the determining comprises determining whether there is overlap between a first message for the first UE and a second message for the second UE; an estimating unit 504 for estimating, as a result of determining that the first UE and the second UE are candidates to be grouped together, 1) a first channel quality of a first channel between the first UE and the network node and 2) a second channel quality of a second channel between the second UE and the network node; and a second determining unit 406 for determining, after estimating the channel qualities and based on the estimated channel qualities, to use the same time and frequency resources to transmit downlink data to the first UE and the second UE.

While the disclosed embodiments described herein have two UEs, the embodiments can group any number of UEs.

Referring back to FIG. 1, the network 100 may be a conventional downlink NOMA-based network where UE 101 and UE 102 are served by the network node 105 in common spectrum resource blocks according to some embodiments. In some instances, the UE 101 may experience a better channel quality compared to the UE 102. In such instances, $|h_1| \geq |h_2|$, where $h_1$ and $h_2$ represents a channel coefficient of the link between the network node 105 and the UE 101 and the UE 102, respectively. The channel gain for each UE is defined as $g_i = |h_i|^2$, where i=1, 2.

Using NOMA, the network node 105 may generate and transmit a superimposed signal to both UEs in the same resources in a time slot t. The superimposed signal is given as $$S(t) = \sqrt{P_1}\, X_1(t) + \sqrt{P_2}\, X_2(t).$$

Here, $X_1(t)$ and $X_2(t)$ are the unit-variance message signals and $P_1$ and $P_2$ are the allocated transmit power for UE 101 and UE 102, respectively. Here, P represents a total power of the network node 105 and $P = P_1 + P_2$. Accordingly, the signal received by the UEs is given by $$Y_i(t) = h_i\left(\sqrt{P_1}\, X_1(t) + \sqrt{P_2}\, X_2(t)\right) + Z_i(t), \; i = 1, 2, \quad (5)$$

where $Z_i(t)$ denotes the Gaussian white noise added in $UE_1$, i=1, 2 (UE 101 and UE 102, respectively).

Figure 5A:
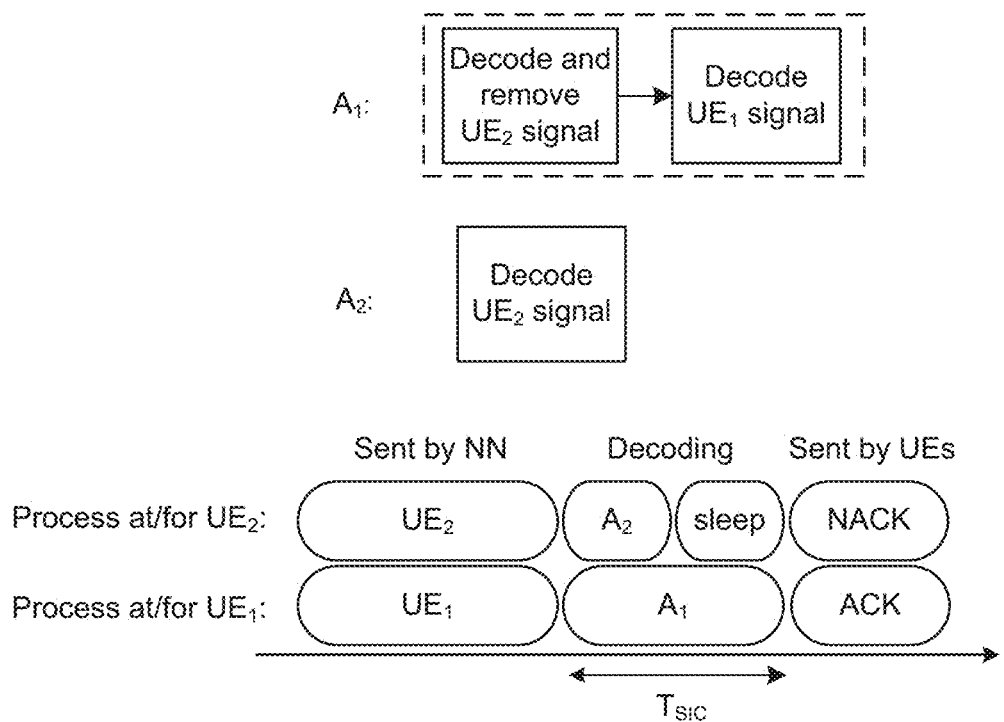
FIGS. 5A-5B illustrate NOMA setups according to some embodiments.

FIG. 5A depicts a first NOMA setup (also referred to as SIC receiver based NOMA) according to some embodiments. As shown in FIG. 5A, $UE_f$, i.e., the UE 101 experiencing a better channel quality, uses a SIC receiver to first decode and remove the message of $UE_2$, i.e., the UE 102 experiencing a worse channel quality, and then decode its own message with no interference. UE 102 uses a non-SIC receiver to decode its own message in the presence of interference due to the UE 101 signal. As shown by $T_{SIC}$ in FIG. 5A, using the SIC receiver results in higher decoding delay compared to using non-SIC receivers. For synchronization of the UEs signals, some delay may be considered by UE 102 or the network node 105 may perform the synchronization. For example, UE 102 may enter a sleep mode until UE 101 completes decoding its message as shown in FIG. 5A.

The goal of each UE is to decode its own message. In some embodiments, a UE may first decode the message of the other UE to reduce the interference. In accordance with the first NOMA setup shown in FIG. 5A, UE 101 uses the SIC receiver to first decode and remove the message of UE 102 and decodes its own message free of interference. UE 102 uses OMA-based receivers to decode its own message and considers the UE 101 message as interference. UE 102 uses OMA-based receivers because it can be theoretically shown that there is no chance that UE 102 can first decode and remove the message of UE 101 and subsequently decode its own message free of interference in the first NOMA setup shown in FIG. 5A. Accordingly, in the first NOMA setup, the maximum achievable rates for UE 101 and UE 102 is given by:

$$\begin{cases} R_1 = \log_2(1 + P_1 g_1) & \text{(i)} \\ R_2 = \log_2\left(1 + \frac{P_2 g_2}{1 + P_1 g_2}\right), & \text{(ii)} \end{cases} \quad (6)$$

The SIC receiver is a high-complexity receiver compared to conventional OMA-based receivers. Using the SIC receiver results in larger decoding delay due to the two step decoding process. Such decoding delay of UE 101 affects the end-to-end transmission delay of both UEs in cases where the signals of UE 101 and UE 102 need to be synchronized. Different methods can be applied to synchronize the signals. For example, $UE_2$ may enter a sleep mode, as shown in FIG. 5A, or the network node 105 may perform the synchronization.

Figure 5B:
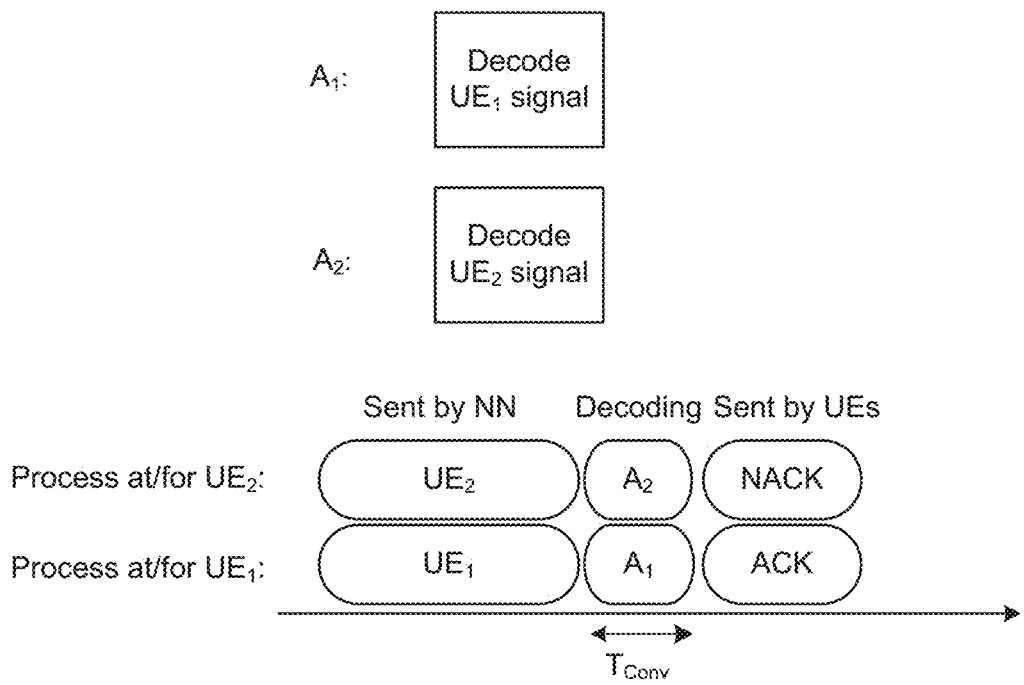

FIG. 5B depicts a second NOMA setup (also referred to as OMA receiver based NOMA) according to some embodiments. In the second NOMA setup shown in FIG. 5B, both UEs utilize a conventional OMA-based receiver. That is, UE 101 does not use a SIC receiver as opposed to the first NOMA setup shown in FIG. 5A. In this NOMA setup, the maximum achievable rates for UE 101 and UE 102 is given by:

$$\begin{cases} \tilde{R}_1 = \log_2\left(1 + \frac{P_1 g_1}{1 + P_2 g_1}\right) & \text{(i)} \\ \tilde{R}_2 = \log_2\left(1 + \frac{P_2 g_2}{1 + P_1 g_2}\right), & \text{(ii)} \end{cases} \quad (7)$$

As shown in FIG. 5B, each of the UEs use OMA-based receivers to decode its own message in the presence of interference caused by the other UE message. The use of conventional receivers and decoders allows lower implementation complexity and decoding delay compared to using SIC based receivers, as shown by $T_{Conv}$ in FIG. 5B.

In the second NOMA setup, each of the UEs decodes its message of interest in one step and considers the other UE message as interference. This allows decoding delay due to the two-step decoding process shown in FIG. 5A to be removed which considerably reduces the decoder complexity and network end-to-end transmission delay.

In some embodiments, the network node 105 may allocate all power and frequency resources to one of the UEs in a time slot. In such embodiments, the other UE is not served in that time slot. When the network node 105 allocates all the power and time-frequency resources to UE 101, the maximum achievable rates for UE 101 and UE 102 is given by:

$$\begin{cases} R_{1,max} = \log_2(1 + P g_1) & \text{(i)} \\ R_2 = 0, & \text{(ii)} \end{cases} \quad (8)$$

When the network node 105 allocates all the power and time-frequency resources to UE 102, the maximum achievable rates for UE 101 and UE 102 is given by:

$$\begin{cases} R_1 = 0 & \text{(i)} \\ R_{2,max} = \log_2(1 + P g_2), & \text{(ii)} \end{cases} \quad (9)$$

Figure 6:
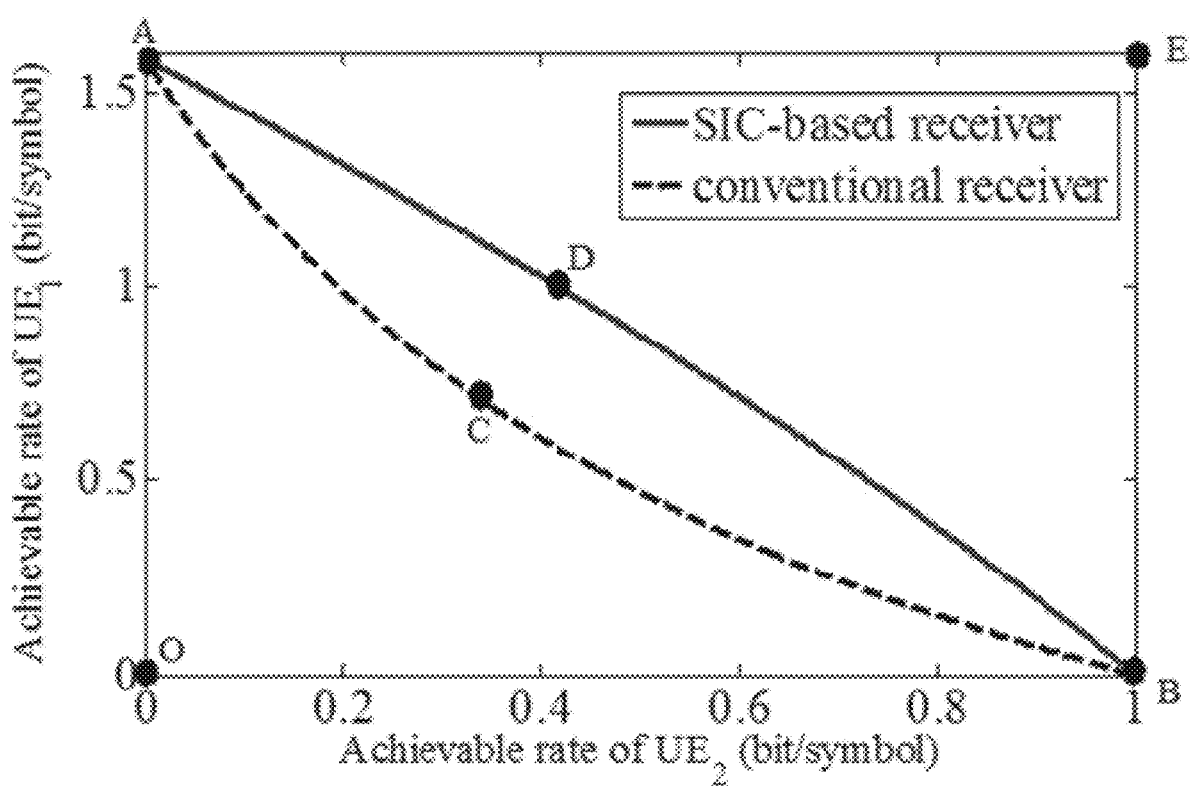
FIG. 6 illustrates the achievable rates for UEs using different data transmission schemes and decoding methods according to one embodiment.

FIG. 6 illustrates the achievable rates given by (6)-(9) and described above for different data transmission schemes and decoding methods for the UEs. As shown in FIG. 6, the achievable rates given by (6) for the SIC receiver based NOMA correspond to region AOBD. The achievable rates given by (7) for the OMA receiver based NOMA correspond to region AOBC. Point A corresponds to the achievable rates given by (8) where the network node 105 allocates all power and time-frequency resources to UE 101. Point B corresponds to the achievable rates given by (9) where the network node 105 allocates all power and time-frequency resources to UE 102. In some embodiments, the achievable rates shown in FIG. 6 may be based on a NOMA setup where the total power of the network node 105 (P) is 40 dBm, a channel gain for UE 101 ($g_1$) is 0.2, and a channel gain for UE 102 ($g_2$) is 0.1.

An embodiment of adaptive decoding schemes where the SIC receiver is only used when required is explained as follows. In this embodiment, the appropriate receiver for UE 101 is determined based on the rate demands of the UEs and the quality of the links between the network node 105 and the UEs. Here, the rate demand of UE 101 and UE 102 is given as $r_i$, i=1, 2. Further, $(r_1, r_2) \in \Re$ (X) indicates that rate demands $r_1$ and $r_2$ are in region X.

Step 1: The UEs (e.g., UE 101 and UE 102) send pilot signals to the network node 105.

Step 2: Using the pilot signals, the network node 105 determines the channel gains ($g_1$ and $g_2$) for the channels between the network node 105 and UE 101 and UE 102.

Step 3: Using the rate demands of the UEs ($r_1$ and $r_2$), i.e., the data rate of interest or the buffered data size, the network node 105 uses achievable rates given by (6)-(9) to determine the appropriate decoding scheme of UE 101. Referring now to FIG. 6, an embodiment of the procedure for determining the appropriate decoding scheme of UE 101 is as follows:

Step 3(a): If $(r_1, r_2) \in \Re$ (AOBC), the network node 105 selects an OMA-based receiver for UE 101. Accordingly, UE 101 does not decode the UE 102 message and considers it as interference. The network node 105 further optimizes the power allocation for the UEs based on the achievable rates given by (7) to find the optimal power allocation which guarantees the rate demands.

Step 3(b): If $(r_1, r_2) \in \Re$ (ACBD), the network node 105 selects a SIC-based receiver for UE 101. Accordingly, UE 101 first decodes and removes the UE 102 message and subsequently decodes the UE 101 message free of interference. The network node 105 further optimizes the power allocation for the UEs based on the achievable rates given by (6) to find the optimal power allocation which guarantees the rate demands.

Step 3(c): If $(r_1, r_2) \in \Re$ (ADBE), it is not possible for the network node 105 to support the rate demands of both UEs simultaneously. In order to provide the UEs according to their rate demands, different schemes may be considered. For example, the total transmit power (P) of the network node 105 can be increased in one scheme. As another exemplary scheme, the UEs may be scheduled in different time slots where their rate demands can each be supported based on the achievable rates given by (8) and (9). The network node 105 may adapt power allocation for the UEs depending on the selected scheme.

For simplicity of explanation, the rate demands of the UEs are limited to their maximum achievable rates, i.e., $r_1 \leq R_{1,max}$ and $r_2 \leq R_{2,max}$, in the embodiments described herein. In some embodiments, however, the rate demands of the UEs may be higher than the maximum achievable rates. In order to support the rate demands of the UEs in such embodiments, region ADBE is expanded by increasing the transmit power (P) of the network node 105 or step 3(c) is performed.

Step 4: The network node 105 informs both UEs about the selected decoding scheme of UE 101. In some embodiments, the network node 105 transmits an indication to the UEs indicating the selecting decoding scheme of UE 101.

Step 5: Depending on the selected decoding scheme of UE 101, both UEs synchronize transmit and/or receive timings. For example, UE 102 may enter a sleep mode until UE 101 completes decoding the UE 101 message as shown in FIG. 5A.

With the proposed scheme, both the end-to-end transmission delay of the NOMA-based setup and the implementation complexity of the UE 101 receiver are considerably decreased.

In the embodiments described herein, the proposed scheme describes extreme cases where the cell-center UE, i.e., UE 101, either uses SIC or conventional OMA-based receivers. This is not required, however, and different suboptimal decoding schemes with different complexities and decoding delays may be used in alternative embodiments of NOMA transmission. The proposed scheme described herein is applicable to every combination of different decoders at UE 101 where each decoding scheme corresponds to a specific region for the achievable rates of the UEs as shown in FIG. 6.

While the embodiments described herein are directed to downlink transmission, the proposed scheme is applicable to uplink transmission. In some embodiments, the network node 105 may consider different decoding schemes based on the rate demands of the UEs and the quality of the channels. In such embodiments, the UEs may adapt their transmit power according to the decoding scheme selected by the network node 105.

Figure 7:
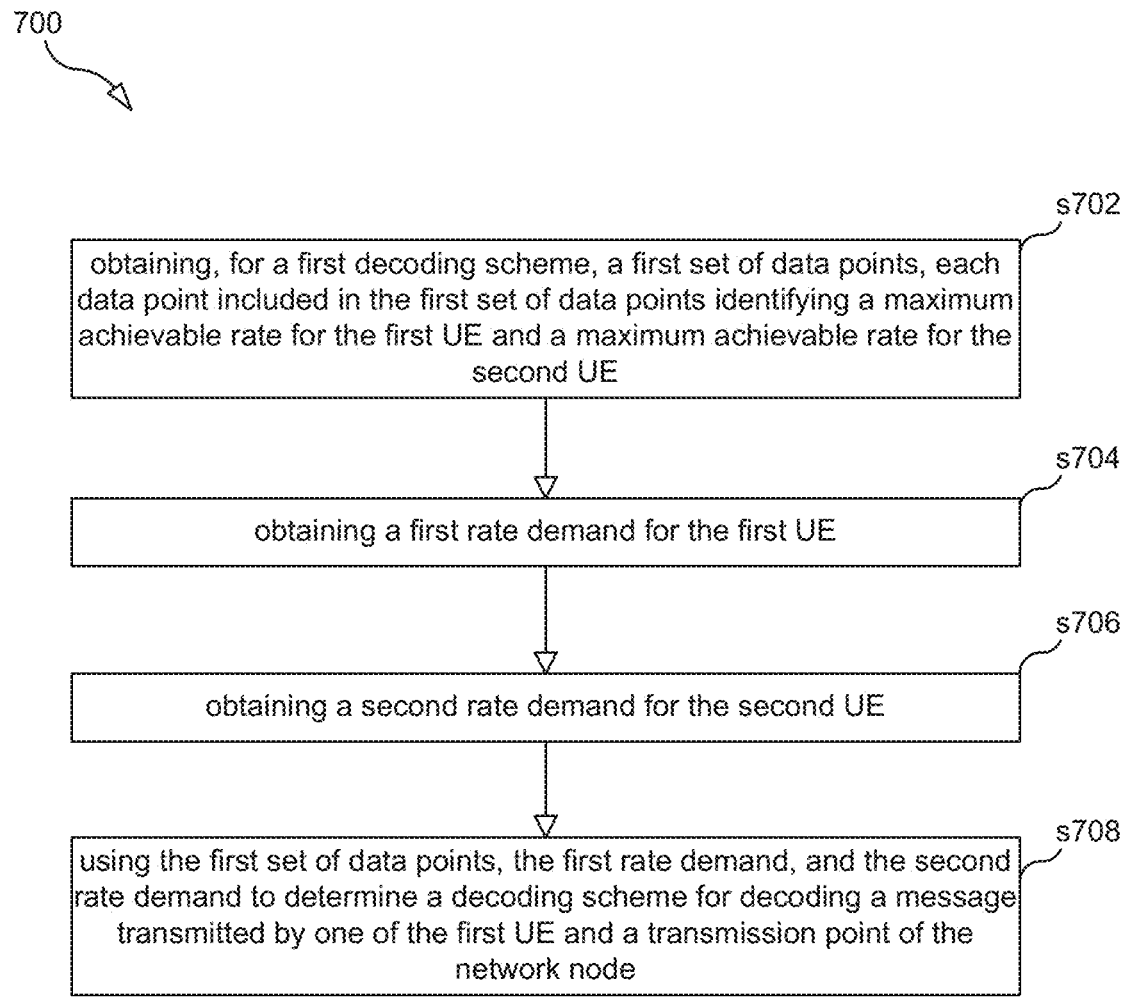
FIG. 7 is a flow chart illustrating a process according to one embodiment.

FIG. 7 is a flow chart illustrating a process 700, according to some embodiments, that is performed by a network node 105, wherein the network node serves a first UE (UE 101) and a second UE (UE 102). Process 700 may begin with step s702 in which network node 105 obtains, for a first decoding scheme, a first set of data points, each data point included in the first set of data points identifying a maximum achievable rate for the first UE and a maximum achievable rate for the second UE. In step s704, the network node obtains a first rate demand for the first UE. In step s706, the network node obtains a second rate demand for the second UE. In step s708, the network node determines, using the first set of data points, the first rate demand, and the second rate demand, a decoding scheme for decoding a message transmitted by one of the first UE and a transmission point of the network node. In some embodiments, the decoding scheme includes using a successive interference cancellation (SIC) receiver to decode a message.

In some embodiments, the step of using the set of data points, the first rate demand, and the second rate demand to determine the decoding scheme includes selecting a data point from the set of data points, wherein selected data points identifies a maximum achievable rate for the first UE that is equal to the rate demand for the first UE; and determining whether the maximum achievable rate for the second UE identified by the selected data point is greater than or equal to the rate demand for the second UE.

In some embodiments, the step of using the set of data points, the first rate demand, and the second rate demand to determine the decoding scheme includes selecting a data point from the set of data points, wherein selected data points identifies a maximum achievable rate for the second UE that is equal to the rate demand for the second UE; and determining whether the maximum achievable rate for the first UE identified by the selected data point is greater than or equal to the rate demand for the first UE.

Figure 8:
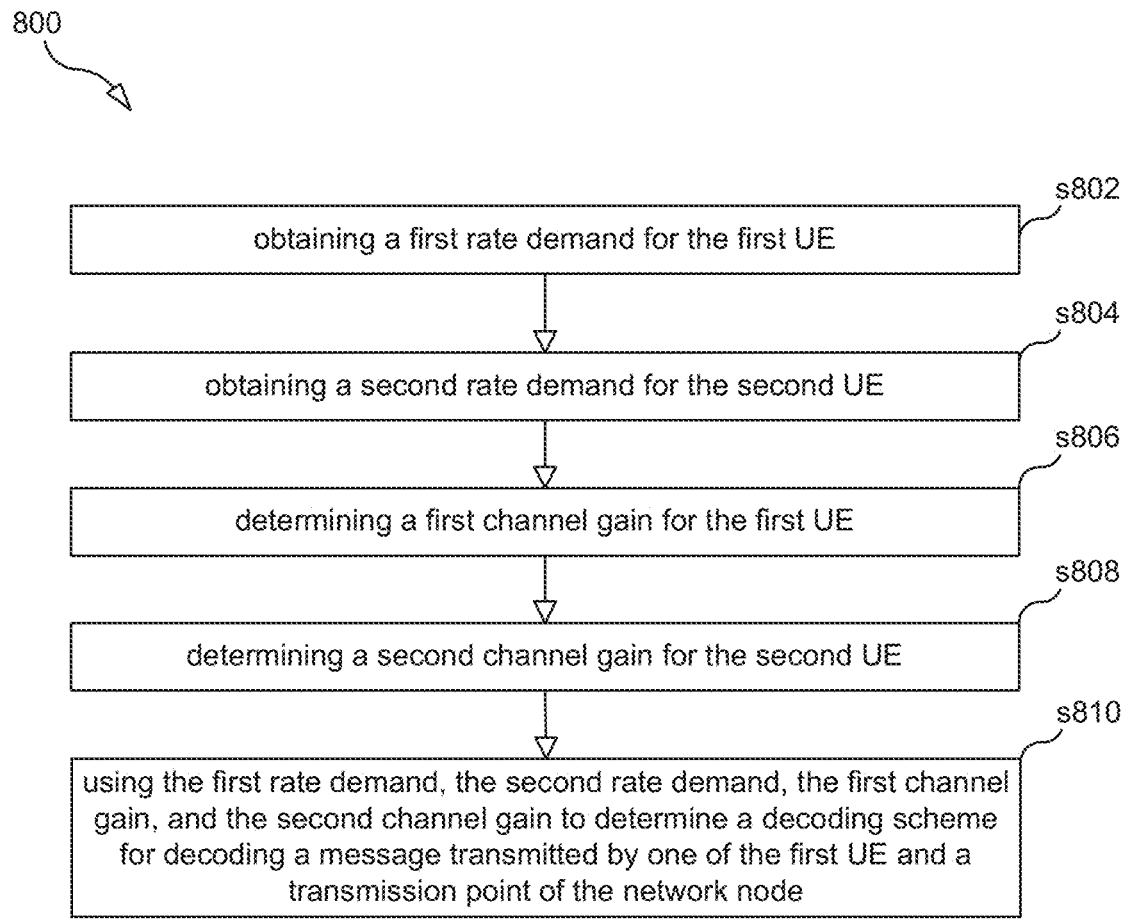
FIG. 8 is a flow chart illustrating a process according to one embodiment.

FIG. 8 is a flow chart illustrating a process 800, according to some embodiments, that is performed by a network node 105, wherein the network node serves a first UE (UE 101) and a second UE (UE 102). Process 800 may begin with step s802 in which network node obtains a first rate demand for the first UE. In step s804, the network node obtains a second rate demand for the second UE. In step s806, the network node determines a first channel gain for the first UE. In step s808, the network node determines a second channel gain for the second UE. In step s810, the network node determines, using the first rate demand, the second rate demand, the first channel gain, and the second channel gain, a decoding scheme for decoding a message transmitted by one of the first UE and a transmission point of the network node. In some embodiments, the decoding scheme includes using a successive interference cancellation (SIC) receiver to decode a message.

Figure 9:
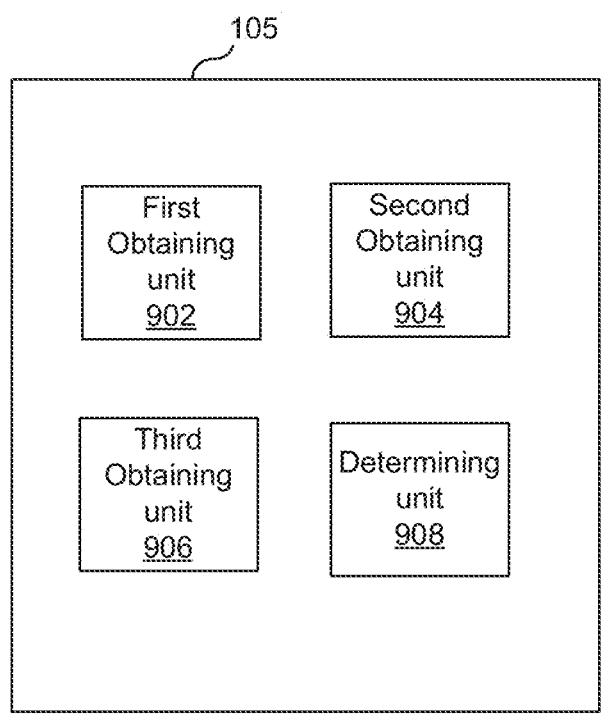
FIG. 9 is a diagram showing functional units of a network node according to one embodiment.

FIG. 9 is a diagram showing functional units of network node 105 according to some embodiments. As shown in FIG. 9, network node 105 includes a first obtaining unit 902 for obtaining, for a first decoding scheme, a first set of data points, each data point included in the first set of data points identifying a maximum achievable rate for the first UE and a maximum achievable rate for the second UE; a second obtaining unit 904 for obtaining a first rate demand for the first UE; a third obtaining unit 906 for obtaining a second rate demand for the second UE; and a determining unit 908 for determining, using the first set of data points, the first rate demand, and the second rate demand, a decoding scheme for decoding a message transmitted by one of the first UE and a transmission point of the network node.

Figure 10:
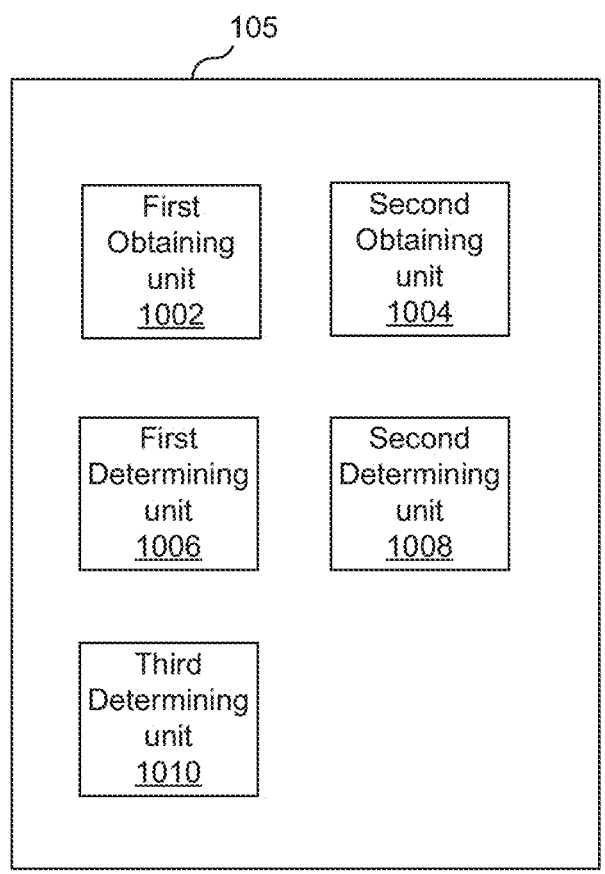
FIG. 10 is a diagram showing functional units of a network node according to one embodiment.

FIG. 10 is a diagram showing functional units of network node 105 according to some embodiments. As shown in FIG. 10, network node 105 includes a first obtaining unit 1002 for obtaining a first rate demand for the first UE; a second obtaining unit 1004 for obtaining a second rate demand for the second UE; a first determining unit 1006 for determining a first channel gain for the first UE: a second determining unit 1008 for determining a second channel gain for the second UE; and a third determining unit 1010 for determining, using the first rate demand, the second rate demand, the first channel gain, and the second channel gain, a decoding scheme for decoding a message transmitted by one of the first UE and a transmission point of the network node.

Figure 11:
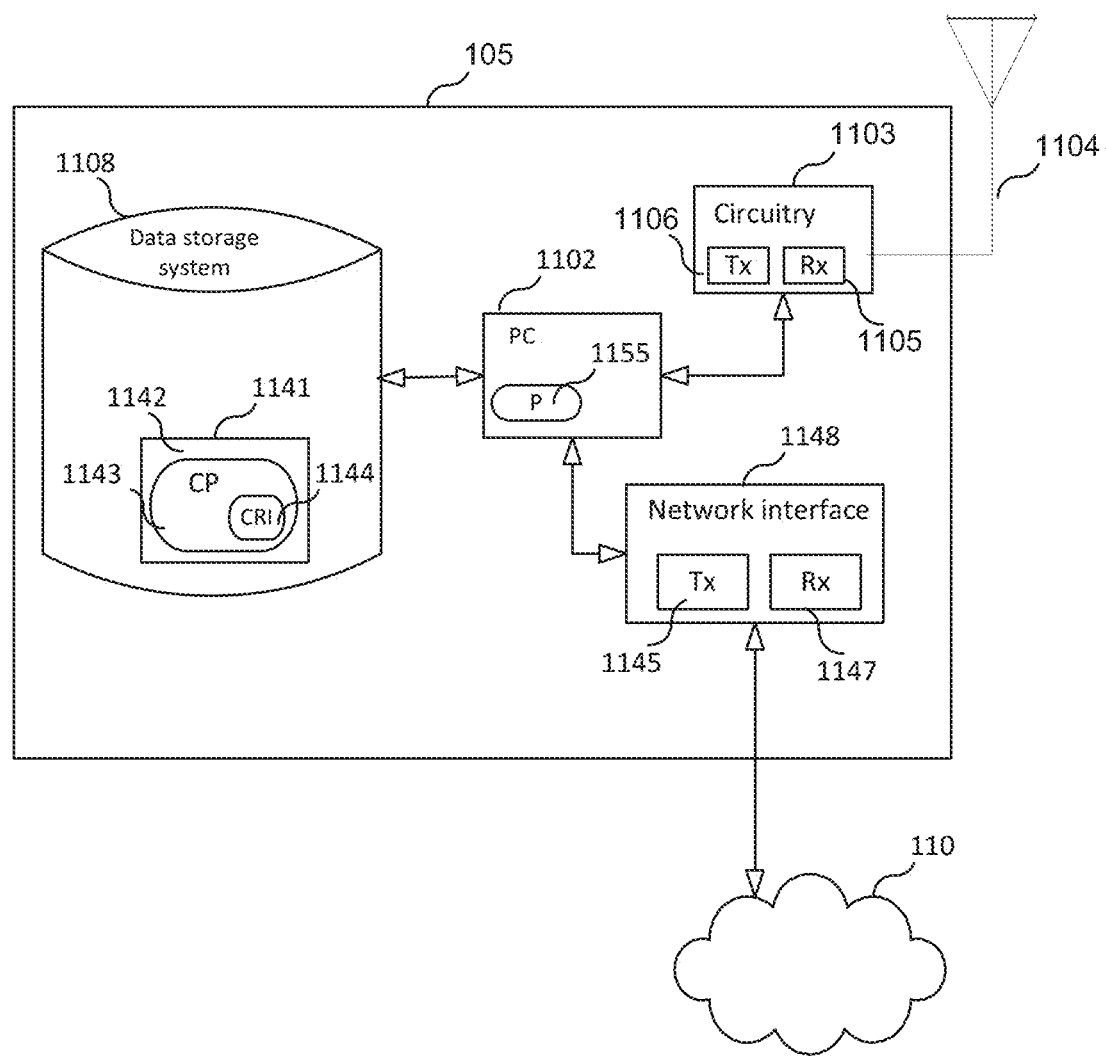
FIG. 11 is a block diagram of a network node according to one embodiment.

FIG. 11 is a block diagram of network node 105 according to some embodiments. As shown in FIG. 11, network node 105 may comprise: a processing circuit (PC) 1102, which may include one or more processors (P) 1155 (e.g., a general purpose microprocessor and/or one or more other processors, such as an application specific integrated circuit (ASIC), field-programmable gate arrays (FPGAs), and the like); a network interface 1148 comprising a transmitter (Tx) 1145 and a receiver (Rx) 1147 for enabling the network node 105 to transmit data to and receive data from other nodes connected to a network 110 (e.g., an Internet Protocol (IP) network) to which network interface 1148 is connected; circuitry 1103 (e.g., radio transceiver circuitry comprising an Rx 1105 and a Tx 1106) coupled to an antenna system 1104 for wireless communication with UEs; and local storage unit (a.k.a., "data storage system") 1108, which may include one or more non-volatile storage devices and/or one or more volatile storage devices (e.g., random access memory (RAM)). In embodiments where PC 1102 includes a programmable processor, a computer program product (CPP) 1141 may be provided. CPP 1141 includes a computer readable medium (CRM) 1142 storing a computer program (CP) 1143 comprising computer readable instructions (CRI) 1144. CRM 1142 may be a non-transitory computer readable medium, such as, but not limited, to magnetic media (e.g., a hard disk), optical media, memory devices (e.g., random access memory, flash memory), and the like. In some embodiments, the CRI 1144 of computer program 1143 is configured such that when executed by data processing apparatus 1102, the CRI causes the network node 105 to perform steps described herein (e.g., steps described herein with reference to the flow charts and/or message flow diagrams). In other embodiments, the network node 105 may be configured to perform steps described herein without the need for code. That is, for example, PC 1102 may consist merely of one or more ASICs. Hence, the features of the embodiments described herein may be implemented in hardware and/or software.

Also, while various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a network node for scheduling at least a first user equipment, UE, and a second UE served by the network node, the method comprising:
   determining that the first UE and the second UE are candidates to be grouped together, wherein the determining comprises determining whether there is an overlap between a first message for the first UE and a second message for the second UE;
   as a result of determining that the first UE and the second UE are candidates to be grouped together, estimating 1) a first channel quality of a first channel between the first UE and the network node and 2) a second channel quality of a second channel between the second UE and the network node; and
   after estimating the channel qualities, determining, based on the estimated channel qualities, to use the same time and frequency resources to transmit downlink data to the first UE and the second UE.

2. The method of claim 1, further comprising:
   transmitting an indication indicating the same time and frequency resources to the first UE and the second UE; and
   transmitting an index indicating the overlap between the first message and the second message to the first UE and the second UE.

3. The method of claim 1, further comprising:
   allocating a first power for transmitting downlink data to the first UE; and
   allocating a second power for transmitting downlink data to the second UE.

4. The method of claim 1, wherein determining that the first UE and the second UE are candidates to be grouped together further comprises:
   calculating a probability value; and
   determining whether the calculated probability value is not less than a probability threshold.

5. The method of claim 4, wherein the first UE has a first rate demand and the second UE has a second rate demand, and wherein the probability value indicates a probability that a first achievable rate is not less than the first rate demand and a second achievable rate is not less than the second rate demand.

6. The method of claim 1, wherein
   estimating the first channel quality comprises: requesting the first UE to transmit a pilot signal and estimating the first channel quality based on the pilot signal transmitted by the first UE, and
   estimating the second channel quality comprises: requesting the second UE to transmit a pilot signal and estimating the second channel quality based on the pilot signal transmitted by the second UE.

7. The method of claim 1, wherein the step of determining, based on the estimated channel qualities, to use the same time and frequency resources to transmit downlink data to the first UE and the second UE comprises:
   obtaining information indicating the first rate demand;
   obtaining information indicating the second rate demand;
   based on the estimated first channel quality, determining a first channel gain for the first UE;
   based on the estimated second channel quality, determining a second channel gain for the second UE; and
   using the first rate demand, the second rate demand, the first channel gain, and the second channel gain to determine whether to use the same time and frequency resources to transmit downlink data to the first UE and the second UE.

8. The method of claim 1, wherein the step of determining, based on the estimated channel qualities, to use the same time and frequency resources to transmit downlink data to the first UE and the second UE comprises:
   for a first decoding scheme, obtaining a first set of data points, each data point included in the first set of data points identifying a maximum achievable rate for the first UE and a maximum achievable rate for the second UE;
obtaining information indicating the first rate demand;
obtaining information indicating the second rate demand; and
using the first set of data points, the first rate demand, and the second rate demand to determine whether to use the same time and frequency resources to transmit downlink data to the first UE and the second UE.

9. The method of claim 8, wherein using the set of data points, the first rate demand, and the second rate demand to determine whether to use the same time and frequency resources to transmit downlink data to the first UE and the second UE comprises:
selecting a data point from the set of data points, wherein selected data points identifies a maximum achievable rate for the first UE that is equal to the rate demand for the first UE; and
determining whether the maximum achievable rate for the second UE identified by the selected data point is greater than or equal to the rate demand for the second UE.

10. The method of claim 8, wherein using the set of data points, the first rate demand, and the second rate demand to determine whether to use the same time and frequency resources to transmit downlink data to the first UE and the second UE comprises:
selecting a data point from the set of data points, wherein selected data points identifies a maximum achievable rate for the second UE that is equal to the rate demand for the second UE; and
determining whether the maximum achievable rate for the first UE identified by the selected data point is greater than or equal to the rate demand for the first UE.

11. A computer program product comprising a non-transitory computer readable medium storing a computer program comprising instructions which, when executed by processing circuitry, causes the processing circuitry to carry out the method of claim 1.

12. A network node, the network node being adapted to:
determine that a first UE and a second UE are candidates to be grouped together, wherein the determining comprises determining whether there is an overlap between a first message for the first UE and a second message for the second UE;
as a result of determining that the first UE and the second UE are candidates to be grouped together, estimate 1) a first channel quality of a first channel between the first UE and the network node and 2) a second channel quality of a second channel between the second UE and the network node; and
after estimating the channel qualities, determine, based on the estimated channel qualities, to use the same time and frequency resources to transmit downlink data to the first UE and the second UE.

13. The network node of claim 12, the network node being further adapted to:
transmit an indication indicating the same time and frequency resources to the first UE and the second UE; and
transmit an index indicating the overlap between the first message and the second message to the first UE and the second UE.

14. The network node of claim 12, the network node being further adapted to:
allocate a first power for transmitting downlink data to the first UE; and
allocate a second power for transmitting downlink data to the second UE.

15. The network node of claim 12, the network node being further adapted to:
calculate a probability value; and
determine whether the calculated probability value is not less than a probability threshold.

16. The network node of claim 15, wherein the first UE has a first rate demand and the second UE has a second rate demand, and wherein the probability value indicates a probability that a first achievable rate is not less than the first rate demand and a second achievable rate is not less than the second rate demand.

17. The network node of claim 12, wherein
estimating the first channel quality comprises: the network node being further adapted to request the first UE to transmit a pilot signal and estimating the first channel quality based on the pilot signal transmitted by the first UE, and
estimating the second channel quality comprises: the network node being further adapted to request the second UE to transmit a pilot signal and estimating the second channel quality based on the pilot signal transmitted by the second UE.

18. The network node of my claim 12, wherein the step of determining, based on the estimated channel qualities, to use the same time and frequency resources to transmit downlink data to the first UE and the second UE comprises the network node being further adapted to:
obtain information indicating the first rate demand;
obtain information indicating the second rate demand;
based on the estimated first channel quality, determine a first channel gain for the first UE;
based on the estimated second channel quality, determine a second channel gain for the second UE; and
use the first rate demand, the second rate demand, the first channel gain, and the second channel gain to determine whether to use the same time and frequency resources to transmit downlink data to the first UE and the second UE.

19. The network node of claim 12, wherein the step of determining, based on the estimated channel qualities, to use the same time and frequency resources to transmit downlink data to the first UE and the second UE comprises the network node being further adapted to:
for a first decoding scheme, obtain a first set of data points, each data point included in the first set of data points identifying a maximum achievable rate for the first UE and a maximum achievable rate for the second UE;
obtain information indicating the first rate demand;
obtain information indicating the second rate demand; and
use the first set of data points, the first rate demand, and the second rate demand to determine whether to use the same time and frequency resources to transmit downlink data to the first UE and the second UE.

20. The network node of claim 19, wherein using the set of data points, the first rate demand, and the second rate demand to determine whether to use the same time and frequency resources to transmit downlink data to the first UE and the second UE comprises the network node being further adapted to:

select a data point from the set of data points, wherein selected data points identifies a maximum achievable rate for the first UE that is equal to the rate demand for the first UE; and determine whether the maximum achievable rate for the second UE identified by the selected data point is greater than or equal to the rate demand for the second UE.

21. The network node of claim 19, wherein using the set of data points, the first rate demand, and the second rate demand to determine whether to use the same time and frequency resources to transmit downlink data to the first UE and the second UE comprises the network node being further adapted to:

select a data point from the set of data points, wherein selected data points identifies a maximum achievable rate for the second UE that is equal to the rate demand for the second UE; and determine whether the maximum achievable rate for the first UE identified by the selected data point is greater than or equal to the rate demand for the first UE.

22. A network node, the network node comprising:

a first determination unit for determining that the first UE and the second UE are candidates to be grouped together, wherein the determining comprises determining whether there is an overlap between a first message for the first UE and a second message for the second UE;

an estimation unit for, as a result of determining that the first UE and the second UE are candidates to be grouped together, estimating 1) a first channel quality of a first channel between the first UE and the network node and 2) a second channel quality of a second channel between the second UE and the network node; and a second determination unit for, after estimating the channel qualities, determining, based on the estimated channel qualities, to use the same time and frequency resources to transmit downlink data to the first UE and the second UE.

* * * * *